United States Patent [19]

Kelsey et al.

[11] Patent Number: 4,783,520

[45] Date of Patent: Nov. 8, 1988

[54] PRODUCTION OF AROMATIC AMORPHOUS THERMOPLASTIC POLY ARYL ETHER FROM ALIPHATIC-AROMATIC DIOL AND WHOLLY AROMATIC DIOL

[75] Inventors: Donald R. Kelsey, Hillsborough; Bernard Cooker, Piscataway; Robert A. Clendinning, New Providence; Robert Barclay, Jr., Trenton; George T. Kwiatkowski, Green Brook, all of N.J.

[73] Assignee: Amoco Corporation, Chicago, Ill.

[21] Appl. No.: 68,973

[22] Filed: Jul. 1, 1987

[51] Int. Cl.$^4$ .............................................. C08G 65/40
[52] U.S. Cl. .................................... 528/174; 528/171; 528/210; 528/211; 528/219; 528/220; 528/226
[58] Field of Search ............... 528/174, 219, 171, 210, 528/211, 220, 226

[56] References Cited

U.S. PATENT DOCUMENTS 3,948,857  4/1976  Feasey et al. ..................... 528/174
4,175,175  11/1979  Johnson et al. .................... 528/125

Primary Examiner—Harold D. Anderson
Attorney, Agent, or Firm—William H. Magidson; Ralph C. Medhurst

[57] ABSTRACT

The method of preparing a thermoplastic polyarylether polymer which comprises reacting a first monomer composition comprising an activated dihalobenzenoid compound and a dihydroxydiphenyl aliphatic monomer in a molar ratio of dihalobenzenoid compound to dihydroxybenzenoid compound of at least 1.2 to 1, adding to the product a second monomer composition comprising a dihydroxybenzenoid compound comprising at least one compound which is free of aliphatic moieties and polymerizing.

19 Claims, No Drawings

PRODUCTION OF AROMATIC AMORPHOUS THERMOPLASTIC POLY ARYL ETHER FROM ALIPHATIC-AROMATIC DIOL AND WHOLLY AROMATIC DIOL

This invention relates to the preparation of amorphous thermoplastic polyarylether polymers which comprises reacting a first monomer composition comprising an activated dihalobenzenoid compound and a dihydroxybenzenoid compound comprising a dihydroxydiphenyl aliphatic monomer in a molar ratio of dihalobenzenoid compound to dihydroxybenzenoid compound of at least 1.2 to 1, adding to the product a second monomer composition comprising a dihydroxybenzenoid compound comprising at least one compound which is free of aliphatic moieties and polymerizing. More particularly, this invention relates to the preparation of amorphous thermoplastic polyarylether sulfone polymers which comprises reacting a first monomer composition comprising dichlorodiphenyl sulfone and dihydroxybenzenoid compound comprising Bisphenol A in a molar ratio of dichlorodiphenyl sulfone to dihydroxybenzenoid compound of at least 1.5 to 1, adding to the product a second monomer composition comprising a dihydroxybenzenoid compound comprising dihydroxydiphenyl sulfone and polymerizing.

Polyarylene polyethers are described in, for example, U.S. Pat. No. 4,175,175. This patent describes a Polymer (A) which has the following structure:

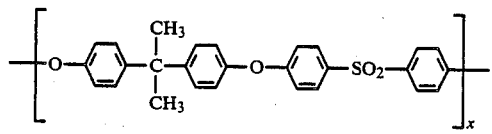
(A)

This polymer is commercially available and is a tough, rigid, high-strength thermoplastic which maintains useful properties over a wide temperature range from −150° F. to above 300° F. Polymer (A) has a good combination of mechanical properties and excellent electrical properties. Said polymer is highly resistant to mineral acids, alkali and salt solutions but can be attacked by environments such as polar organic solvents. Thus, there is a need to improve the environmental resistance, particularly the solvent resistance of Polymer (A), so that it can be used in applications where it will be exposed to an aggressive solvent environment, for example, that are found during steam sterilization containing corrosion inhibitors such as morpholine.

This patent also describes Polymer (B) having the structure:

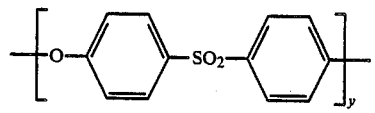
(B)

which is also commercially available. It has many properties similar to Polymer (A) except it is hygroscopic, water-crazes in steam environment and tends to crystallize from solvent in production. Further, it cannot be cast into films or moldings from some of the common solvents used for Polymer (A). Polymer (A) has a Tg of about 185° C. while Polymer (B) has a Tg of about 220° C. with the result that Polymer (A) is easier to melt fabricate while Polymer (B) has a somewhat higher use temperature.

Polymers having more desirable properties were prepared by copolymerizing dichlordiphenyl sulfone, dihydroxydiphenyl sulfone (Bisphenol S) with either Bisphenol A or hydroquinone. Subsequent studies have shown that when a monomer composition comprising Bisphenol A, Bisphenol S and dichlorodiphenyl sulfone are polymerized in the typical sulfur-containing solvents, such as sulfones or sulfoxides, in the presence of a base, such as an alkali metal hydroxide or carbonate, high molecular weight polymer is difficult to obtain consistently. Although not wishing to be bound by any theory, it is believed that this difficulty in reliably obtaining polymer molecular weight is due to the decomposition of Bisphenol A to form compounds which act as chain-stopping agents and thus limit the polymer molecular weight. This decomposition is believed to be aggravated by the higher reaction temperatures especially above 150° C., convenient for producing the polymer at a reasonable rate of reaction. However, our studies have shown further that, even when the polymerization is conducted so as to provide a period at lower temperature before proceeding to the higher reaction temperatures, high molecular weight polymer is still not obtained consistently.

We further believe that the Bisphenol S effectively prevents the Bisphenol A from being stabilized even at a lower initial reaction temperature. This may occur because the Bisphenol S is more acidic and therefore reacts preferentially with the alkaline catalyst or because of the competition of Bisphenol S for the available alkaline catalyst. Partial decomposition of Bisphenol A can occur resulting in less than desired molecular weights.

Another undesirable consequence is that said polymers contain undesirable end-groups, such as (2-propenyl)phenyl groups. Such end-groups can adversely affect the thermal stability of the polymer. It is believed that such endgroups arise from the decomposition of Bisphenol A.

Therefore, it is difficult to consistently produce polymers with controllable molecular weight and polymers having the desired properties. This problem of Bisphenol A is common to substantially all bisphenols containing an aliphatic bridging group identified below as Bisphenol I. Further, substantially all other aromatic diols identified below as Bisphenol J react in a similar manner to Bisphenol S when copolymerized with a Bisphenol I monomer. Accordingly, there is a need for a reproducible method of consistently producing copolymers of activated dihalobenzenoid compounds, Bisphenol J and Bisphenol I wherein Bisphenol J and Bisphenol I have the structures set forth below.

Briefly, Bisphenol I has the structure:

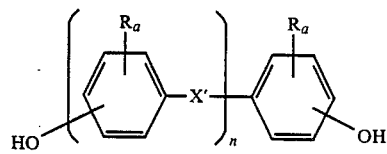

wherein R is independently halogen, $C_1$ to $C_6$ alkyl, or $C_4$ to $C_8$ cycloalkyl, X' is independently an aliphatic group

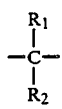

wherein $R_1$ and $R_2$ are independently hydrogen, aryl of 6 to 12 carbon atoms, $C_1$ to $C_9$ alkyl or form an alicyclic ring of 3 to 9 carbon atoms, a is an integer of 0 to 4 and n is independently an integer of 1 to 3 while Bisphenol J has the structure:

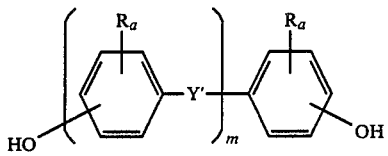

wherein Y' is a direct bond,

—$SO_2$—, —SO—, —S— or —O—, m is a number from 0 to 3, and $R_a$ is the same as above.

While Feasey U.S. Pat. No. 3,948,857 discloses a process for the preparation of aromatic sulfone copolymers in which a polyaryl sulfone containing repeat units —Ar—$SO_2$— (where Ar is a bivalent aromatic residue which may vary from unit to unit in the polymer chain and at least some of the Ar units have an aromatic ether or thioether group in the polymer chain ortho or para to at least one —$SO_2$— group) is caused to react with an alkali metal salt of at least one halophenol or halothiophenol or with essentially equimolar quantities of an alkali metal salt of at least one dihydric phenol or thiophenol and at least one dihalobenzenoid compound, in which the halogen atoms are activated by an electron-attracting group, all of the examples are directed to reacting salts of halophenols with preformed commercial polymers (Polymer A in Examples 1 and 2 and Astrel in Example 3) and there is no appreciation that Bisphenol I monomers decompose at the temperature necessary for the condensation of Bisphenol J monomers, particularly Bisphenol S. Further, the Feasey polymers have a blocky structure due to the reliance on transetherification, which degrades the backbone polymer. The transetherification reactions have low reaction rates compared to the nucleophilic route used herein.

The general object of this invention is to provide a process of reproducibly producing polyarylethers having excellent properties. More particularly, the object of this invention is to provide a method of producing polymers by polymerization of Bisphenol J, Bisphenol I and dihalobenzenoid compound. Other objects appear hereinafter.

The general object of this invention can be attained by a multi-step process of (1) reacting a composition comprising an activated dihalobenzenoid compound and dihydroxybenzenoid compound comprising Bisphenol I in a molar ratio of activated dihalobenzenoid compound to dihydroxybenzenoid compound of at least 1.2 to 1, (2) adding a monomer composition comprising Bisphenol J in a concentration sufficient to provide substantially equal molar concentrations of dihalobenzenoid compound and dihydroxybenzenoid compounds, and (3) polymerizing. Under these conditions, the Bisphenol I monomer, preferably Bisphenol A, is protected from decomposition during the first step since there is a substantial excess of activated dihalobenzenoid compound and substantially all of the Bisphenol J is added in the second step after the polymerization has been initiated. The excess dihalobenzenoid compound also insures that a relatively low molecular weight product is formed in the first step and the final polymer is random and not blocky. The polymers produced in this manner have a higher second order transition temperature than Polymer (A) and are amorphous and do not have Polymer (B)'s tendency to solvent crystallize. Further, using a suitable concentration of Bisphenol A and Bisphenol S, it is possible to produce a polymer having approximately the same second order transition temperature as Polymer (B).

Briefly, the polymers of this invention are formed by reacting in a first step, a monomer composition comprising an activated dihalobenzenoid compound and a dihydroxybenzenoid compound comprising Bisphenol I in a molar ratio of activated dihalobenzenoid compound to dihydroxybenzenoid compound of at least 1.2 to 1 in a reaction medium comprising a base and at least one aprotic polar solvent preferably selected from the group consisting of a sulfoxide and sulfone, after the reaction is initiated, adding a monomer composition comprising Bisphenol J in a concentration sufficient to provide substantially equal molar quantities of dihalobenzenoid compound and dihydroxybenzenoid compound and polymerization to completion. Of course, the first polymerization step can be carried out in a number of stages, and the polymerization of substantially all of the Bisphenol J can be carried out in several stages.

Suitable activated dihalobenzenoid compounds useful in this invention include 4,4'-bis(chlorophenyl) sulfone; 4,4'-bis(fluorophenyl) sulfone; 4-chlorophenyl-4'-fluorophenyl sulfone; 4,4'-dichlorobenzophenone; 4,4'-difluorobenzophenone; 4,4'-bis(4-chlorophenylsulfonyl) biphenyl, 2,6-dichlorobenzonitrile, etc.

The dihydroxybenzenoid compounds useful in this invention include Bisphenol I monomers described above, Bisphenol J monomers described above and monocyclic aromatic monomers such as hydroquinone, resorcinol, catachol, naphthalene diols, etc. Suitable Bisphenol I monomers, which are dihydroxydiphenyl alkanes include Bisphenol A, 4,4'-bis(hydroxyphenyl) methane, 1,1-bis(4-hydroxyphenyl)cyclohexane, etc. Suitable Bisphenol J monomers include 4,4'-bis(hydroxyphenyl) sulfone; 4,4'-dihydroxydiphenyl; 4,4'-dihydroxybenzophenone; 4,4'-bis(hydroxyphenyl) ether; etc.

Typically, the molar ratio of Bisphenol I to Bisphenol J can range from about 1:19 to 9:1, preferably 1:19 to 3:1. In the range of about 1:19 to 1:3 using only Bisphenol A and Bisphenol S, polymers having about the same Tg as Polymer (B) are produced. The molar ratio of dihalobenzenoid monomer to dihydroxy monomers in the process can range from about 0.9:1 to 1.1:1, preferably about unity. An excess of dihalobenzenoid monomer must be present in the first stage as explained above.

The bases useful in this invention include one or more alkali metal hydroxides (sodium hydroxide, potassium hydroxide), carbonates (sodium carbonate, sodium bicarbonate, potassium carbonate, potassium bicarbonate, cesium carbonate, etc.), acetates (sodium acetate, potassium acetate, etc.), etc. that are capable of forming a mono or di-salt with the hydroxy monomer. The overall concentration of alkali metal compound should be from about 1 to 2 equivalents of alkali metal compound per hydroxyl equivalent. A deficiency of alkali metal compound in the overall process generally leads to low molecular weight polymers. In the first stage of the process, it is advantageous to use from about 2 to 10 equivalents of alkali metal compound per hydroxyl equivalent to minimize decomposition of the Bisphenol I and to facilitate a rapid reaction.

The reaction medium preferably comprises a sulfur containing sulfoxide or sulfone which is common in this art alone or together with a hydrocarbon or halohydrocarbon which is capable of co-distilling with water. Suitable co-distilling or entrainment agents include aromatic hydrocarbons such as benzene, toluene, xylene, ethylbenzene, chlorobenzene, etc.

The sulfur-containing solvents have the formula:

in which each $R_1$ represents a monovalent lower hydrocarbon group free of aliphatic unsaturation, which preferably contains less than about 8 carbon atoms or when connected together represents a divalent alkylene group with b being an integer from 1 to 2 inclusive. Thus, in all of these solvents all oxygens and two carbon atoms are bonded to the sulfur atom. Contemplated for use in this invention are such solvents as those having the formula:

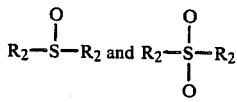

where the $R_2$ groups are independently lower alkyl, such as methyl, ethyl, propyl, butyl, and like groups, and aryl groups such as phenyl and alkylphenyl groups such as the tolyl group, as well as those where the $R_2$ groups are inter-connected as a divalent alkylene bridge such as:

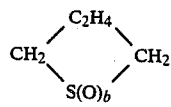

in tetrahydrothiophene oxides and dioxides. Specifically, these solvents include dimethylsulfoxide, dimethylsulfone, diphenylsulfone, diethylsulfoxide, diethylsulfone, diisopropylsulfone, tetrahydrothiophene 1,1-dioxide (commonly called tetramethylene sulfone or sulfolane) and tetrahydrothiophene-1 monoxide.

Other aprotic polar solvents can be used, such as dimethyl acetamide, dimethyl formamide, N-methylpyrolidone, benzophenone, etc.

The co-distilling agent and sulfur-containing solvent can be used in a weight ratio from about 10:1 to about 1:10 preferably from about 1:1 to about 1:7.

In somewhat greater detail the polymers of this invention are produced by polymerizing a composition comprising at least one activated dihalobenzenoid compound and at least two dihydroxybenzenoid compounds in a mole ratio of Bisphenol I (dihydroxydiphenyl aliphatic) to Bisphenol J of about 1:19 to 9:1 in a multistage process which comprises (1) reacting in the first stage activated dihalobenzenoid compound and from about 5 to 90 mole percent of the dihydroxybenzenoid compounds comprising at least 5 mole percent Bisphenol I in a molar ratio of dihalobenzenoid compound to dihydroxybenzenoid compound of at least 1.2 to 1 to produce a product having a reduced viscosity below about 0.4, (2) in the second stage adding the remainder of the monomers to be polymerized comprising Bisphenol J and polymerizing same to a reduced viscosity above about 0.4. For purposes of this invention, reduced viscosity (RV) is measured as a 0.2 g/100 ml solution in N-methylpyrrolidinone at 25° C.

In the first polymerization step, from about 5 to 90 mole percent of the aromatic diols and from about 6 to 100 mole percent of the dihalobenzenoid compound can be added to the reactor batchwise or incrementally and correspondingly from about 94 to 10 mole percent of the aromatic diols and the remainder of the dihalobenzenoid compound can be added to the reactor batchwide or incrementally and polymerized in the second step. In the first step or stage, the mole ratio of dihalobenzenoid compound to dihydroxybenzenoid compound must be at least 1.2 to 1, preferably at least 1.5 to 1 and most preferably at least 2 to 1. As the mole ratio increases, the lower the probability of decomposition of the Bisphenol I monomer, the lower the molecular weight of the reaction product formed in the first step, the more random the final polymer and the more Bisphenol J present in the first step without deleterious effect on the Bisphenol I monomer.

While it is generally preferred that there is no Bisphenol J present in the first stage, up to 50 mole percent of the total Bisphenol J in the polymer can be present in the first stage provided that the mole ratio of dihalobenzenoid compound to dihydroxybenzenoid compound is at least 1.5 to 1, preferably at least 2 to 1, and the equivalent ratio of alkali metal to hydroxy is at least 2 to minimize the possibility of Bisphenol I decomposing.

In the second step or stage, the remainder of the dihydroxybenzenoid compound, dihalobenzenoid compound and base are added and the polymerization carried to completion.

Typically, the reaction medium comprising sulfur containing solvent and co-distilling agent are heated to about 120° to about 190° C. for about 0.5 to about 24 hours in the first stage and optionally raised and kept at about 160° to about 250° C. to obtain the desired degree of reaction. In the second stage of the polymerization, monomer is added and the reaction mixture is then usually maintained at about 120° to about 180° C. for about 0.5 to about 2 hours and then raised to about 200° to about 250° C. for about one to sixteen hours. The final polymerization temperature is sometimes limited by the boiling point of the solvent.

The reaction is carried out in an inert atmosphere such as nitrogen under atmospheric pressure, although higher or lower pressures can be used. Water is continuously removed from the reaction mass as an azeotrope so that substantially anhydrous conditions are maintained during the polymerization.

Preferably, after the desired molecular weight of the copolymer is attained, the polymer is treated with an activated aromatic halide or aliphatic halide such as methyl chloride or benzyl chloride, and the like, to convert the terminal hydroxyl groups into hydrocarbyl end groups and stabilize the polymer. Excess dihalobenzenoid compound also stabilizes the polymer. Optionally additional base can be added first prior to or during this treatment to facilitate this conversion.

The polymers of this invention can be blended with one or more compatible thermoplastic polymers such as polyarylates, poly(aryl ethers), polyetherimides, polyesters, aromatic polycarbonates including polyestercarbonates, polyurethanes, polyhydroxyethers.

EXAMPLE 1

A 500 ml four neck flask fitted with a stainless steel mechanical stirrer, a thermocouple probe and a Claisen arm fitted with a nitrogen inlet tube and a distillation trap, condenser and gas bubbler was charged with 2,2-bis(4-hydroxyphenyl)propane (Bisphenol A, 0.045 mole, 10.27 g), 4,4'-dichlorodiphenylsulfone (0.300 mole, 86.15 g), potassium carbonate (ground and dried, 0.309 mole, 42.71 g), sulfolane (distilled, 200 ml) and chlorobenzene (90 ml). The flask contents were purged with high purity nitrogen for 30 minutes and then stirred and heated to 170° C. in an oil bath controlled with a digital temperature controller during which time chlorobenzene began to distill. The reaction temperature was held at 170° C. for 30 minutes. The oil bath was removed, the reaction was cooled to 150° C. and bis(4-'hydroxyphenyl)sulfone (Bisphenol S, 0.255 mole, 63.82 g), sulfolane (40 mil), and chlorobenzene (20 ml) were added to the flask. The reaction mixture was heated to 230° C., whereupon chlorobenzene was added slowly, dropwise, to the flask by means of an addition funnel over the next two hours. After three hours at 230° C., the oil bath was removed and the reaction was cooled to room temperature. The following day the reaction mixture was reheated to 230° C. Reaction samples were taken every hour by means of a glass tube and suction. After seven hours (a total of 10 hours at 230° C.), the reaction mixture was cooled to 180° C., chlorobenzene (40 ml) and potassium carbonate (2 g) were added, and methyl chloride was sparged into the reaction mixture for 30 minutes to end-cap the polymer.

The reaction samples were coagulated into methanol in a Waring blender, washed in the blender with methanol, then twice with water, and again with methanol, filtered, and dried in the vacuum oven at 100° to 110° C.

The reaction mixture was diluted with 800 ml of a 1:1 (v/v) solution of sulfolane/chlorobenzene and filtered through a medium porosity sintered glass funnel. The filtrate was diluted with an additional 300 ml of the sulfolane/chlorobenzene solution and coagulated into methanol in a Waring blender. The polymer was washed in the blender with methanol, filtered, then refluxed with water for one hour, refluxed with methanol for one hour, filtered, and dried in the vacuum oven at 100° to 110° C. overnight.

Reduced viscosities of the polymer were measured as a 0.2 g/100 ml solution in HPLC-grade N-methylpyrrolidinone at 25° C. The reduced viscosities of the reaction samples are reported in the Table. The reduced viscosity increased substantially between six and nine hours at 230° C. and after nine hours at 230° C., the reduced viscosity was 0.73 dl/g and reached a final value of 0.76 dl/g.

The polymer exhibited a melt flow (380° C., 1P) of 3.49 dg/min. after 10 minutes and 3.26 dg/min. after 30 minutes; a melt stability of 0.93. A compression molded plaque (330° C.) exhibited a tensile modulus of 260,000 psi, tensile strength 11,000 psi, pendulum impact of 62 ft-lb/in$^3$, and a glass transition at 215° C.

Control A

The polymerization was conducted essentially as given in Example 1 except that all of the materials were charged to the reactor initially. The reaction mixture was heated to 170° C. for 30 minutes and then to 230° C. for three hours, cooled to room temperature, reheated the following day to 230° C. and held for an additional seven hours, and samples were taken essentially as given in Example 1.

The reduced viscosities of the reaction sample are given in the Table. Compared to Example 1, the reduced viscosity achieved in Control A did not exceed 0.46 dl/g. Essentially no change in molecular weight occurred between four hours and ten hours reaction time at 230° C.; the final RV was 0.41 dl/g.

EXAMPLE 2

The polymerization was conducted essentially as in Example 1 except that instead of an initial reaction temperature of 170° C. for 30 minutes, the reaction was conducted at 150° C. for four hours, whereupon the Bisphenol S, sulfolane and chlorobenzene were added and the reaction mixture was reacted at 230° C. essentially as in Example 1. The reduced viscosities of the reaction samples are given in the Table and show that high molecular weight was achieved as in Example 1.

Analysis of the final polymer by nuclear magnetic resonance (NMR) spectroscopy showed the presence of methoxyphenyl end-groups only (0.028 milliequivalent/g polymer) and no detectable (2-propenyl)phenyl end-groups.

Control B

The polymerization of Example 2 was repeated except with all of the materials charged initially to the reaction flask, viz. as a one-stage process. The reduced viscosities are given in the Table. The molecular weight of the polymer did not change after five hours at 230° C. and did not exceed an RV of 0.45 dl/g.

NMR analysis of the final polymer showed the presence of methoxyphenyl end-groups (0.035 milliequivalent/g polymer) and also (2-propenyl)phenyl end-groups (0.027 milliequivalent/g).

| Time (Hours) at 230° C. | Reduced Viscosity of Polymer Samples as Function of Reaction Time at 230° C. | | | |
|---|---|---|---|---|
| | Example 1 | Control A | Example 2 | Control B |
| :3 | 0.20 | 0.31 | 0.08 | 0.22 |
| :4 | 0.20 | 0.41 | 0.28 | 0.34 |
| :5 | 0.27 | 0.42 | 0.47 | 0.43 |
| :6 | 0.38 | 0.46 | 0.61 | 0.42 |
| :7 | 0.48 | 0.45 | 0.68 | 0.42 |
| :8 | 0.59 | 0.40 | 0.77 | 0.42 |
| :9 | 0.73 | 0.41 | 0.72 | 0.45 |
| :10 | 0.76 | 0.41 | 0.76 | 0.42 |

EXAMPLE 3

The polymerization was conducted essentially as in Example 2 except that after the initial four hour period at 150° C., the reaction mixture was then cooled to room temperature. The next day the Bisphenol S, sulfolane and chlorobenzene were added to the flask and the reaction mixture was heated to 230° C. for a total of six hours with dropwise addition of chlorobenzene for the first two hours. The isolated polymer had a reduced viscosity of 0.56 dl/g. The Tg (by DSC) was 220° C. The melt stability at 380° C. was excellent (0.97). A compression molded plaque exhibited the following properties:

Tensile Modulus: 240,000 psi
Tensile Strength: 11,000 psi
Yield Elongation: 7.5%
Break Elongation: 8.7%
Pendulum Impact: 56.6 ft-lb/in$^3$

EXAMPLE 4

The polymerization was conducted essentially as in Example 2 except that unground, dried potassium carbonate was used, the carbonate charge was increased to 0.315 mole (43.54 g), and the second step of the reaction after the addition of Bisphenol S was conducted at 235° C. After 6 hours at 235° C., the reduced viscosity of the polymer (0.2 g/100 ml in N-methylpyrrolidinone, 25° C.) was 0.67 dl/g and after 10 hours, the reduced viscosity was 0.64 dl/g as measured on reaction samples.

The polymer exhibited a melt flow of 4.99 dg/min. (380° C., 1P) and excellent melt stability (melt flow ratio 1.01). A compression molded plaque exhibited the following properties: tensile modulus 242,000 psi, tensile strength 11,400 psi, yield elongation 8%, elongation at break 6.3-8.5% pendulum impact strength 83 ft-lb/in$^3$, and 220° C. glass transition temperature.

NMR analysis of the polymer showed the presence of methoxyphenyl end-groups (0.037 milliequivalent/g polymer) and no detectable (2-propenyl)phenyl end-groups.

EXAMPLE 5

In an apparatus of the type used in Example 1 were placed 2,2-bis(4-hydroxyphenyl)propane (Bisphenol A, 0.072 mole, 16.44 g), 4,4'-dichlorodiphenylsulfone (0.1808 mole, 51.92 g), potassium carbonate (ground, 0.2169 mole, 29.98 g), sulfolane (160 g), and toluene (160 g). The stirred mixture was heated with a purge of prepurified nitrogen to 160° C.; during this time toluene and water distilled off. The temperature was held at 160°-163° C. for two hours with continued dropwise addition of toluene. The oil bath was removed, toluene addition was discontinued, and 4,4'-biphenol (0.1081 mole, 20.12 g) and toluene (10 ml) were added. The reaction mixture was heated to 220° C., dropwise addition of toluene was resumed, and the reaction mixture was maintained at 218°-221° C. for three hours. Toluene addition was stopped, the reaction mixture was allowed to cool to 164° C., and chlorobenzene (160 g) was added. Methyl chloride was sparged into the solution to end-cap the polymer, and the polymer was recovered by coagulation, washing and drying essentially as described in Example 1.

The reduced viscosity of the polymer, measured as a 1.0 g/100 ml solution in N-methylpyrrolidinone, was 0.57 dl/g. The melt flow (380° C., 44 psi) was 36.8 dg/min. after 10 minutes and 25.8 dg/min. after 30 minutes (melt flow ratio 0.70). A plaque compression molded at 330° C. exhibited the following properties: tensile modulus 233,000 psi, tensile strength 10,000 psi, pendulum impact strength, 67 ft-lb/in$^3$, glass transition temperature 200° C.

Control C

The polymerization was conducted essentially as in Example 5 except that all materials were charged to the flask initially. The mixture was heated for 2 hours at 158°-163° C. and then for three hours at 220°-222° C. The polymer was end-capped with methyl chloride and the polymer recovered essentially as in Example 5. The reduced viscosity, measured as a 1.0% solution in N-methylpyrrolidinone, was 0.41 dl/g.

EXAMPLE 6

In an apparatus of the type used for Example 1 were placed 2,2-bis(4-hydroxyphenyl)propane (Bisphenol A, 0.0478 mole, 10.92 g), 4,4'-dichlorodiphenylsulfone (0.120 mole, 34.46 g), 4,4'-bis(4-chlorophenylsulfonyl)-biphenyl (0.0400 mole, 20.14 g), potassium carbonate (ground, 0.192 mole, 26.54 g), sulfolane (distilled, 160 g), and chlorobenzene (160 g). The stirred mixture was heated with a purge of prepurified nitrogen to 170° C.; during this time chlorobenzene and water distilled off. The temperature was held at 170° C. for one hour with continual dropwise addition of chlorobenzene. The oil bath was removed, chlorobenzene addition was discontinued and 4,4'-biphenol (0.1115 mole, 20.77 g) and chlorobenzene (10 ml) were added. The reaction mixture was heated to 220° C., dropwise addition of chlorobenzene was resumed, and the reaction mixture was stirred and heated at 218°-220° C. for 5 hours. The reaction was terminated and the polymer recovered essentially as in Example 5.

The reduced viscosity of the polymer, measured as a 1 g/100 ml solution in N-methylpyrrolidinone, was 0.75 dl/g. A plaque compression molded at 360° C. exhibited the following properties: tensile modulus 232,000 psi, tensile strength 10,800 psi, pendulum impact strength 74 ft-lb/in$^3$, glass transition temperature 225° C.

EXAMPLE 7

The polymerization was conducted essentially as given in Example 5 using 16.5 g (0.0723 mole) 2,2-(4-hydroxyphenyl) propane, 51.69 g (0.1800 mole) 4,4'-dichlorodiphenylsulfone, 29.85 g (0.2160 mole) ground potassium carbonate and chlorobenzene in place of toluene. The reaction mixture was heated at 170° C. for one hour, cooled, 20.19 g (0.1084 mole) 4,4'-biphenol was added, and the polymerization conducted at 220° C. for 5 hours essentially as in Example 5. The recovered polymer exhibited a reduced viscosity (1 g/100 ml in N-methylpyrrolidinone, 25° C.) of 0.70 dl/g.

We claim:

1. The method of preparing a thermoplastic polyarylether polymer which comprises reacting a first monomer composition comprising an activated dihalobenzenoid compound and a dihydroxydiphenyl aliphatic monomer in a molar ratio of dihalobenzenoid compound to dihydroxybenzenoid compound of at least 1.2 to 1, adding to the resultant reaction product a second monomer composition comprising a dihydroxybenzenoid compound comprising al least one compound which is free of aliphatic moieties and. polymerizing, wherein the aliphatic moiety of said dihydroxydiphenyl aliphatic monomer has the structure:

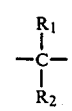

wherein R$_1$ and R$_2$ are independently hydrogen, aryl of 6 to 12 carbon atoms, C$_1$ to C$_9$ alkyl or form an alicyclic ring of 3 to 9 carbon atoms.

2. The process of claim 1 wherein said compound which is free of aliphatic moieties is bisphenol J and has the structure:

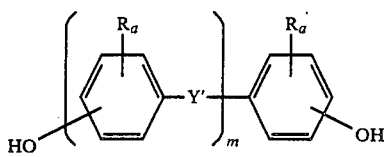

wherein Y' is a direct bond, or Y' is

—SO$_2$—, —SO—, —S—, or —O—, m is a number from 0 to 3, and R is independently halogen, C$_1$ to C$_6$ alkyl, or C$_4$ to C$_8$ cycloalkyl and a is an integer from 0 to 4.

3. The process of claim 2 wherein bisphenol J is 4,4'-dihydroxydiphenyl sulfone.

4. The process of claim 2 wherein Bisphenol J is 4,4'-dihydroxybisphenyl.

5. The method of preparing a thermoplastic polyarylether polymer in a multi-stage process which comprises (1) reacting a composition comprising an activated dihalobenzenoid compound and dihydroxybenzenoid compound comprising bisphenol I in a molar ratio of activated dihalobenzenoid compound to dihydroxybenzenoid compound of at least 1.2 to 1, (2) adding a monomer composition comprising bisphenol J in a concentration sufficient to provide substantially equal molar concentrations of dihalobenzenoid compound and dihyroxybenzenoid compounds, and (3) polymerizing, wherein bisphenol I has the structures:

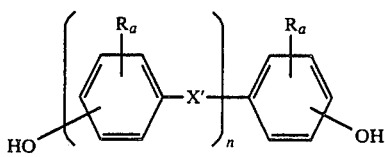

wherein R is independently halogen, C$_1$ to C$_6$ alkyl, or C$_4$ to C$_8$ cycloalkyl, X' is independently an aliphatic group

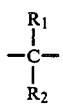

wherein R$_1$ and R$_2$ are independently hydrogen, aryl of 6 to 12 carbon atoms, C$_1$ to C$_9$ alkyl or form an alicyclic ring of 3 to 9 carbon atoms, a is an integer of 0 to 4 and n is independently an integer of 1 to 3, bisphenol J has the structure:

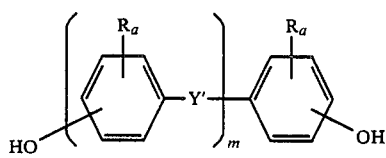

wherein Y' is a direct bond, or Y' is

—SO$_2$—, —SO—, —S—, or —O—, m is a number from 0 to 3, and R$_a$ is the same as set forth above.

6. The process of claim 5 wherein bisphenol I comprises bisphenal A.

7. The process of claim 5 wherein said dihalobenzenoid compound comprises 4,4'dichlorodiphenylsulfone.

8. The process of claim 5 wherein bisphenol J comprises 4,4'-dihydroxydiphenyl sulfone.

9. The process of claim 5 wherein bisphenol J comprises 4,4'-dihydroxydiphenyl sulfone.

10. The process of claim 5 wherein bisphenol I comprises bisphenol A, bisphenol J comprises at least one monomer selected from the group consisting of 4,4'dihydroxydiphenyl sulfone and 4,4,'bisphenol, and the activated dihalobenzenoid compound comprises at least one member selected from the group consisting of 4,4'dichlorodiphenylsulfone and 4,4'-bis(4-chlorophneylsulfonyl) biphenyl.

11. The process of claim 10 wherein the molar ratio of dihalobenzenoid compound to dihydroxybenzenoid compound in step 1 is at least 1.5 to 1.

12. The method of preparing a thermoplastic polyarylether polymer in a multi-stage process which comprises polymerizing at least one activated dihalobenzenoid compound and at least two dihydroxybenzenoid compounds in a mole ratio of bisphenol I to bisphenol J of about 1:19 to 9:1, which comprises (1) reacting in the first stage activated dihalobenzenoid compound and from about 5 to 90 mole percent of the dihydroxybenzenoid compounds comprising at least 5 mole percent bisphenol I in a molar ratio of dihyroxybenzeoid compound to dihalobenzenoid compound of at least 1.2 to 1 to produce a product having a reduced viscosity below about 0.4 (2) in the second stage adding the remainder of the monomers to be polymerized comprising bisphenol J and polymerizing same to a reduced viscosity above about 0.4, wherein bisphenol I has the structure:

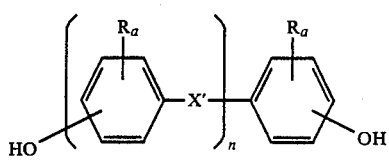

wherein R is independently halogen, C$_1$ to C$_6$ alkyl, or C$_4$ to C$_8$ cycloalkyl, X' is independently an aliphatic group

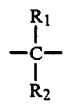

wherein R$_1$ and R$_2$ are independently hydrogen, aryl of 6 to 12 carbon atoms, C$_1$ to C$_9$ alkyl or form an alicyclic ring of 3 to 9 carbon atoms, a is an integer of 0 to 4 and n is independently an integer of 1 to 3, bisphenol J has the structure:

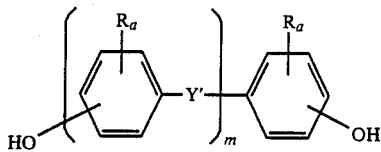

wherein Y' is a direct bond, or Y' is

—SO$_2$—, —SO—, —S—, or —O—, m is a number from 0 to 3, and R$_a$ is the same as set forth above and the reduced viscosity is measured as a 0.2 g/100 ml solution in N-methylpyrrolidinone at 25°.

13. The process of claim 12 wherein bisphenol I comprises bisphenol A.

14. The process of claim 12 wherein bisphenol J comprises 4,4'-dichlorodiphenyl sulfone.

15. The process of claim 12 wherein bisphenol J comprises 4,4'biphenol.

16. The process of claim 12 wherein the dihalobenzenoid compound comprises 4,4'dichlorodiphenyl sulfone.

17. The process of claim 12 wherein the dihalobenzenoid compound comprises 4,4'-bis(4-chlorophenylsulfonyl) biphenyl.

18. The process of claim 12 wherein the mole ratio of bisphenol I to bisphenol J is about 1:19 to 3:1, bisphneol I comprises bisphenol A, bisphenol J comprises at least, one member selected from the group consisting of 4,4'-dihydroxydiphenyl sulfone and 4,4'bisphenol and the dihalobenzenoid compound comprises at least one member selected from the group consisting of 4,4'dichlorodiphenylsulfone and 4,4'-bis(4-chlorophenylsulfonyl) biphenyl.

19. The process of claim 18 wherein the mole ratio of dihalobenzenoid compound to dihyroxybenzenoid compound in the first state is at least 1.5 to 1.

* * * * *

UNITED STATES PATENT OFFICE
CERTIFICATE OF CORRECTION

Patent No. 4,783,520              Dated  November 8, 1988

Inventor(s) Kelsey et al

It is certified that error appears in the above-identified patent and that said Letters Patent is hereby corrected as shown below:

| Column | Line | |
|---|---|---|
| 11 | 24 | "dihydroxybisphenyl" should read --dihydroxybiphenyl-- |
| 12 | 10 | "bisphenal" should read --bisphenol-- |
| 12 | 21 | "4,4,' bisphenol," should read --4,4' biphenol-- |
| 12 | 38 | "dihydroxybenzeoid" should read --dihydroxybenzenoid-- |
| 12 | 41 | "0.4(2)" should read --.4,(2)-- |
| 14 | 12 | "bisphneol" should read --bisphenol-- |
| 14 | 15 | "4,4' bisphenol" should read --4,4' biphenol-- |
| 14 | 21 | "dihyroxybenzenoid" should read --dihydroxybenzenoid-- |
| 14 | 22 | "state" should read --stage-- |

Signed and Sealed this

Second Day of May, 1989

Attest:

DONALD J. QUIGG

Attesting Officer

Commissioner of Patents and Trademarks